United States Patent Office 3,260,917
Patented July 12, 1966

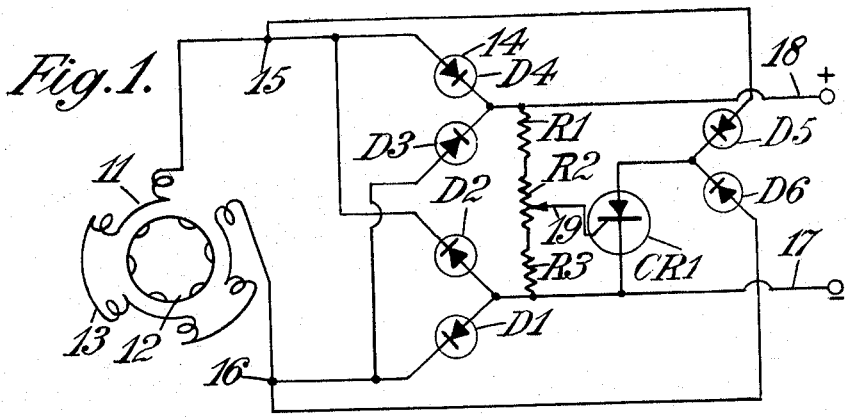
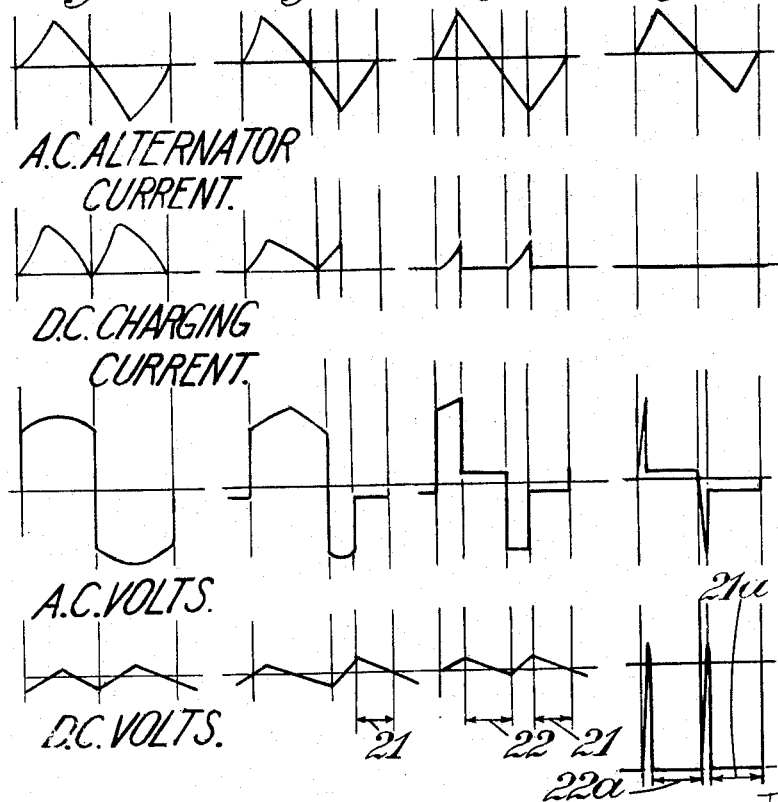

3,260,917
ELECTRICAL SUPPLY SYSTEMS WITH MEANS RESPONSIVE TO THE OUTPUT OF SAID SYSTEM
Rodney Haydn Shimwell and Edward Leyburn Robinson, London, England, assignors to Simms Motor Units Limited, London, England, a British company
Filed Aug. 7, 1961, Ser. No. 129,691
Claims priority, application Great Britain, Aug. 9, 1960, 27,587/60
2 Claims. (Cl. 321—18)

The invention relates to electrical supply systems and is more particularly, but not exclusively, concerned with such systems for motor vehicles in which an alternator is driven by an engine which propels the vehicle.

The invention provides, an electrical supply system comprising an alternator, a rectifier for rectifying the output of the alternator, and means responsive to the D.C. output for providing a low resistance conducting path across the alternator output during part of each cycle thereby to control at least one parameter (e.g. the voltage) of the D.C. output to lie within a predetermined range.

Preferably the alternator has a permanently magnetized rotor.

Preferably the rectifier is a full wave rectifier and preferably the said low resistance conducting path is a unidirectional conducting path.

The said low resistance conducting path may be provided by one or more controlled silicon rectifiers or one or more transistors.

Preferably the D.C. output voltage, or other voltage derived from the D.C. output, is applied to one or more zener diodes, or to the control electrode of a controlled silicon rectifier, or to another voltage-sensitive device, arranged to cause the said path to be conducting when the said applied voltage is in excess of a predetermined value.

A transformer may be coupled between the alternator output and the full wave rectifier and the said conducting path may be provided across the output winding of the transformer. Preferably the transformer is an auto-transformer in which the permanently magnetized rotor of the alternator provides direct magnetic excitation of the transformer core.

Some specific examples of electrical supply systems embodying the invention will now be described with reference to the accompanying drawings, in which:

FIGURE 1 is a circuit diagram of one system,

FIGURES 2A–2D are waveform diagrams illustrating the operation of the system of FIGURE 1, FIGURES 3–7 are circuit diagrams of other systems, which are modifications or developments of that shown in FIGURE 1.

Figure 3:
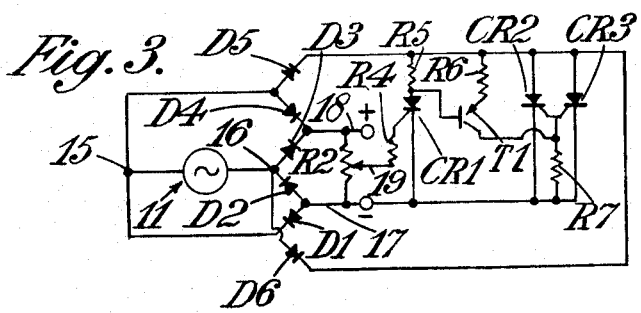

The system illustrated in FIGURE 1 comprises an alternator 11, having a permanently magnetized rotor 12 and a salient pole stator 13; a full-wave bridge rectifier 14 having four rectifier elements or diodes D1, D2, D3, D4 and connected across the output terminal 15, 16 of the alternator; two gating rectifier elements or diodes D5, D6 connecting respectively between the alternator output terminals 15, 16 and one main electrode of a controlled silicon rectifier CR1, the other main electrode of which is connected to the negative D.C. output line 17; and a potentiometer in the form of three resistors R1, R2, and R3 connected between the positive and negative D.C. output lines 18, 17. The potentiometer tapping 19 is connected to the control electrode of the controlled silicon rectifier CR1.

FIGURES 2A–2D show the waveforms of the A.C. alternator current, the D.C. output current, the A.C. alternator voltage and the D.C. output voltage, under various conditions when the D.C. output lines are connected to a motor car battery to be charged. Under the conditions shown in FIGURE 2A the mean value of the D.C. output current is the maximum which the system can provide (4 amps.) and the rectifier CR1 does not conduct during any part of each cycle. When the value of the D.C. voltage during each alternative half-cycle (the second half of the cycle shown in FIGURE 2B) rises to a sufficiently high value for the voltage derived from the output voltage and applied to the control electrode of the rectifier CR1 by the potentiometer tapping 19 to cause that rectifier to become conductive over the last part 21 of each cycle, a low resistance path is thus provided across the alternator output and the D.C. output current falls to zero, for that part 21 of the cycle. The mean value of the D.C. current is then about 1 amp.

It has been found that when alternate half-cycles of the alternator output are short-circuited in that manner, the intervening half-cycles are of reduced amplitude. This tends to ensure that under the conditions of FIGURE 2B the short-circuiting period provided by the rectifier CR1 occurs consistently in alternate half-cycles.

When the value of the D.C. voltage applied to the rectifier CR1 by the tapping 19 also rises to a sufficiently high value during each intervening half-cycle to cause that rectifier to become conductive over the last part 22, of each intervening half-cycle, as shown in FIGURE 2c, the D.C. output current falls to zero over the parts 21 and 22 of each cycle. The mean value of the D.C. current is then about 0.25 amp.

When the D.C. output lines are open-circuited by removal of the load, the rectifier CR1 is rendered conductive over the parts 21a and 22a of each cycle, which together make up nearly the whole of the cycle, as the D.C. output current is zero.

The diode elements D1 and D2 respectively limit the amplitude of the inverse half wave impressed on the controlled rectifier CR1 to less than the forward voltage drop of those diode elements. That amplitude is still further reduced by the forward voltage drop of the elements D5 and D6.

The rectifier elements D1–D6 and the controlled rectifier CR1 are preferably all mounted on a common cooling fin or equivalent heat sink, as the bridge rectifier losses fall as those of the controlled rectifier circuit rise. The elements D5, D6 and D4, D3 are preferably in juxtaposition on the cooling fin, as also are the elements D1, D2 and CR1.

In the modified system shown in FIGURE 3, the controlled silicon rectifier CR1 is supplemented by two further controlled silicon rectifiers CR2, CR3, connected in parallel with it and with each other, so that a more powerful alternator can be controlled. A transistor T1 is provided to act as a transfer device between the triggering controlled rectifier CR1 and the main current-carrying controlled rectifiers CR2, CR3. When the rectifier CR1 conducts, it completes a current path through the resistor R6 and the emitter and base electrodes of the transistor T1, thereby rendering the collector-base circuit of that transistor conductive to feed a triggering voltage to the control electrodes of the rectifiers CR2, CR3. It is necessary for the two rectifiers CR2, CR3, to have substantially similar characteristics so that they become conductive together and share the short-circuiting current between them.

Figure 4:
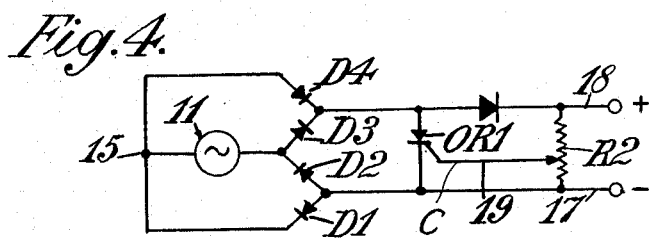
Figure 5:
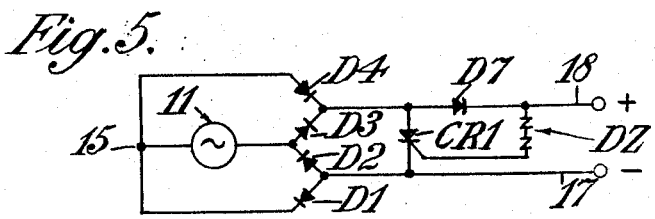
Figure 6:
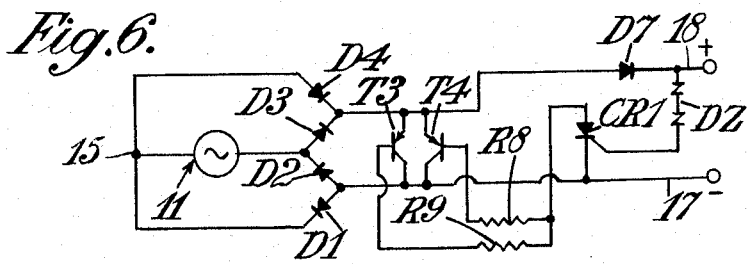

In the modified systems shown in FIGURES 4, 5 and 6, the rectifier elements or diodes D5 and D6 are omitted, their functions being performed by the elements D4 and D1 of the bridge rectifier, and a rectifier element or diode D7 is provided to prevent short-circuiting of the load by the controlled rectifier CR1.

In the modified systems shown in FIGURES 5 and 6 the potentiometer R2 is replaced by a number of zener DZ diodes connected in series. A triggering potential is applied to the control electrode of the rectifier CR1 when the voltage across the chain of zener diodes DZ reaches 12.2 volts in the case of FIGURE 5, and 13 volts in the case of FIGURE 6.

In the system shown in FIGURE 6 the rectifier CR1 controls two parallel-connected power transistors T3, T4. When the rectifier CR1 becomes conductive it causes the transistors T3, T4 to provide parallel low-resistance conducting paths across the alternator output.

Figure 7:
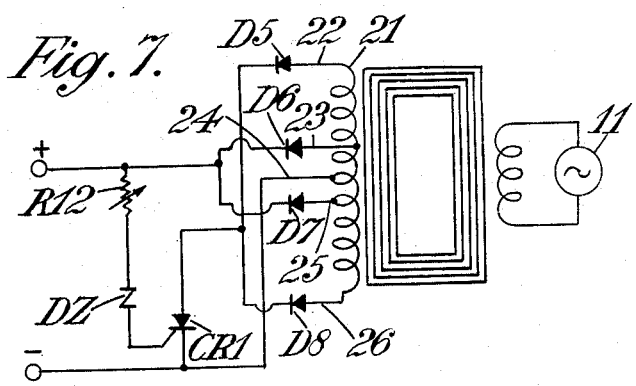

In the modification shown in FIGURE 7 a transformer is coupled between the alternator output and the full wave rectifier so that the controlled silicon rectifier CR1 can provide across the output of the alternator 11 a low resistance conducting path for a higher current than that which the silicon rectifier CR1 can itself withstand.

The D.C. negative line is taken from a centre tap 24 on the secondary winding 21 of the transformer and the D.C. positive line is taken from the full wave rectifier comprising diodes D6 and D7 arranged in push-pull respectively from tappings at 23 and 25 on the secondary winding 21.

The silicon rectifier CR1 is connected across the centre tap 24 and the commoned output of diodes D5 and D8 connected respectively to tappings 22 and 26 on the secondary winding. The control electrode of the silicon rectifier CR1 is connected through a zener diode DZ and a variable resistor R12 to the D.C. positive output line. When the voltage across the zener diode DZ and the variable resistor R12 rises to a value high enough to trigger the silicon rectifier CR1, a low resistance conducting path is provided across the output of the transformer and consequently across the output of the alternator.

For example, if the ratio of the number of secondary windings between tappings 22 and 26 to the number of secondary windings between tappings 23 and 25 is 6:1 and the short circuit current peak for the alternator is 60 amps, then the peak short circuit current taken by the silicon rectifier would be 10 amps. At the same time if the battery charge peak inverse voltage is 16 volts, the peak inverse voltage applied to the silicon rectifier would be 96 volts. Silicon rectifiers with high voltage, low current operation of this order are at present more readily available than silicon rectifiers with high current, low voltage operation.

Figure 8:
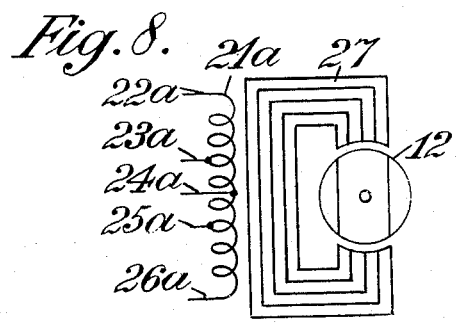
FIGURE 8 shows a modification or development of part of the system shown in FIGURE 7.

In the modification shown in FIGURE 8 the transformer of FIGURE 7 is replaced by an autotransformer in which the permanently magnetized rotor 12 gives direct magnetic excitation of the core 27. The tappings 22a, 23a . . . 26a on the winding 21a in FIGURE 8 correspond to the tappings 22, 23 . . . 26 on the secondary winding 21 of the transformer in FIGURE 7. The remainder of the circuit of the modification shown in FIGURE 8 is the same as that of FIGURE 7, and the operation is also substantially the same.

In these examples it is desirable that the full load and short circuit currents are the same or as nearly the same as is possible. This condition is obtained when the internal impedance of the alternator is predominantly inductive which occurs, for example, when the leakage reactance is high or the demagnetizing effect of the stator reaction is high.

Various components of some of the systems of these examples have the following commercial description or characteristics:

FIGURE 3:
    CR1, CR2, CR3—each, Texas type IS600
    T1—type OC16
    D1–D6—each, type GEX 541
    R4—50 ohms
    R5—680 ohms
    R6—1,000 ohms
    R7—68 ohms FIGURE 6:
    CR1—Texas type IS600
    T3, T4—each, type 2N1146A
    D1–D4—each, type GIC50
    D7—2 diodes type GIC50 in parallel
    R8—2.7 ohms
    R9—2.7 ohms The invention is not restricted to the details of the foregoing examples. For instance, controlled rectifiers of larger current carrying capacity may be employed, e.g. in the systems of FIGURES 1, 4 and 5 or unijunction transistors may alternatively be employed. Further, if controlled rectifiers, or other control devices for relatively high powers, of types adapted for operation with high voltages and low currents are employed, then the alternator may be double wound with closely coupled windings, one set of those windings may feed a full wave bridge rectifier for the D.C. power output at low voltage and heavy current, and the other set of the windings may feed a full wave bridge rectifier providing a high voltage low current output which is controlled substantially as in one of the described examples, the coupling between the alternator windings providing interaction between them so that the power output is consequentially controlled.

We claim:
1. An electrical supply system comprising in combination an alternator having an alternator output including at least two output terminals, rectifier means electrically connected in a low resistance circuit between the alternator output and the said output terminals to provide across the output terminals a rectifier output derived from substantially the entire alternator output energy, a conducting path switchable to a low resistance electrically coupled across the alternator output in a circuit in parallel with the circuit supplying the said rectified output to the said output terminals comprising a controlled silicon rectifier having a triggering control electrode as a switching device, means connected to the alternator output and the triggering control electrode to provide to the triggering control electrode a voltage instantaneously dependent on the voltage across the output terminals, said last mentioned means including structure for triggering the controlled silicon rectifier to switch in said path the low resistance when the voltage across the output terminals exceeds a predetermined value to shunt the alternator output and thereby reduce the supply from the alternator to the said output terminals.

2. A combination as defined in claim 1 where a storage battery is coupled to said two output terminals for charging from the alternator output, and including a further rectifier means connected between said controlled silicon rectifier and said two output terminals to prevent discharge of the storage battery through said path.

References Cited by the Examiner
UNITED STATES PATENTS

| | | | |
|---|---|---|---|
| 2,751,550 | 6/1956 | Chase | 321—18 |
| 3,099,782 | 7/1963 | Smith | 320—39 |
| 3,111,617 | 11/1963 | Cady | 320—39 |
| 3,123,759 | 3/1964 | Grey | 320—40 |
| 3,141,124 | 7/1964 | Atherton | 321—43 |

OTHER REFERENCES

Abramson: "Battery Charger," I.B.M. Technical Disclosure, vol. 7, No. 6, November 1964, p. 432.

G.E. Controlled Rectifier Manual, first edition, March 1960, pp. 85 and 86, TK 2798 G4g.

JOHN F. COUCH, *Primary Examiner.*

MILTON O. HIRSHFIELD, *Examiner.*

SAMUEL BERNSTEIN, G. J. BUDOCK, G. GOLDBERG, *Assistant Examiners.*